United States Patent
Dijk et al.

(10) Patent No.: US 8,745,028 B1
(45) Date of Patent: Jun. 3, 2014

(54) INTERPRETING ADJACENT SEARCH TERMS BASED ON A HIERARCHICAL RELATIONSHIP

(75) Inventors: Luuk Van Dijk, Zurich (CH); Ivan Zauharodneu, Zurich (CH)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 13/452,179

(22) Filed: Apr. 20, 2012

Related U.S. Application Data (63) Continuation of application No. 12/345,366, filed on Dec. 29, 2008, now abandoned.

(60) Provisional application No. 61/016,916, filed on Dec. 27, 2007.

(51) Int. Cl.
*G06F 17/30* (2006.01)

(52) U.S. Cl.
USPC .......................................................... 707/708

(58) Field of Classification Search
CPC .............. G06F 17/30; G06F 17/30873; G06F 17/30864; G06F 17/30867; G06F 17/3053; G06F 17/30734; G06Q 30/0601; G06Q 30/02; Y10S 707/99933; Y10S 707/99935; Y10S 707/99942; Y10S 707/99943
See application file for complete search history.

(56) References Cited

U.S. PATENT DOCUMENTS

| | | | |
|---|---|---|---|
| 6,934,634 B1 | 8/2005 | Ge | |
| 7,788,265 B2 | 8/2010 | Morscher et al. | |
| 7,822,734 B2 * | 10/2010 | Kumar | 707/708 |
| 8,135,737 B2 * | 3/2012 | Chowdhury et al. | 707/771 |
| 2004/0199498 A1 * | 10/2004 | Kapur et al. | 707/3 |
| 2006/0085392 A1 * | 4/2006 | Wang et al. | 707/3 |
| 2006/0122994 A1 * | 6/2006 | Kapur et al. | 707/4 |
| 2007/0260595 A1 | 11/2007 | Beatty et al. | |
| 2008/0104047 A1 | 5/2008 | Nagarajayya | |
| 2009/0144241 A1 | 6/2009 | Modzelewski | |

OTHER PUBLICATIONS

An et al., "Fuzzy Concept Graph and Application in Web Document Clustering," Object Technology Center, Institute of Software, The Chinese Academy of Sciences, 2001, pp. 101-106.
Kawano, "Overview of Mondou Web Search Engine Using Text Mining and Information Visualizing Technologies," Department of Systems Science Graduate School of Informatics, Kyoto University, Japan, 2001, pp. 234-241.
Chung et al., "Thematic Mapping—From Unstructured Documents to Taxonomies," Verity, Inc., 2002, pp. 608-610.
Osborn et al., "JUSTICE: A Judicial Search Tool Using Intelligent Concept Extraction," Department of Computer Science and Software Engineering, University of Melbourne, Australia, 1999, pp. 173-181.

* cited by examiner

*Primary Examiner* — Dinku Gebresenbet
(74) *Attorney, Agent, or Firm* — Harrity & Harrity, LLP

(57) ABSTRACT

A computer-implemented method may include receiving, from a device, a search query that includes search terms, parsing the search terms into combinations of search terms, where each of the combinations includes one or more adjacent search terms, determining whether a hierarchical relationship exists for the one or more adjacent search terms of each of the combinations, generating one or more interpretations for each of the combinations based on whether the hierarchical relationship exists for the one or more adjacent search terms, performing a search based on at least one of the one or more interpretations to identify search results, generating a search result document containing the search results, and providing, to the device, the search result document.

20 Claims, 7 Drawing Sheets

INTERPRETING ADJACENT SEARCH TERMS BASED ON A HIERARCHICAL RELATIONSHIP

RELATED APPLICATION APPLICATIONS

This application is a continuation of U.S. patent application Ser. No. 12/345,366, filed Dec. 29, 2008, which claims priority to U.S. Provisional Patent Application No. 61/016,916, filed Dec. 27, 2007, the disclosures of which are incorporated by reference herein in their entirety.

BACKGROUND

Search engines may implement various algorithms to identify Web pages relevant to search terms contained in a user's query. However, many search engines have limitations for providing relevant Web pages to a user because the search engines do not interpret the hierarchical meaning of the search terms. Rather, the search engine provides Web pages that merely include the search terms or variations of the search terms.

SUMMARY

According to one aspect, an computer-implemented method may include receiving, from a device, a search query that includes search terms, parsing the search terms into combinations of search terms, where each of the combinations includes one or more adjacent search terms, determining whether a hierarchical relationship exists for the one or more adjacent search terms of each of the combinations, generating one or more interpretations for each of the combinations based on whether the hierarchical relationship exists for the one or more adjacent search terms, performing a search based on at least one of the one or more interpretations to identify search results, generating a search result document containing the search results, and providing, to the device, the search result document.

According to another aspect, a computer-readable medium may include instructions that may be executable by one or more processors. The computer-readable medium may include one or more instructions for receiving a search query that includes search terms, one or more instructions for parsing the search query into combinations, where each of the combinations includes one or more of the search terms, one or more instructions for determining that a hierarchical relationship exists between adjacent search terms within one of the combinations having two or more search terms, based on hierarchical taxonomy data, one or more instructions for generating a meaning for the adjacent search terms of the one of the combinations in correspondence to a meaning associated with the hierarchical taxonomy data, one or more instructions for searching for search results based on the meaning associated with the one of the combinations, and one or more instructions for generating a search result document including the search results.

According to yet another aspect, a search engine may be implemented within one or more devices. The search engine may include a search component. The search component may receive a search query including search terms, parse the search query into combinations of one or more of the search terms, select a meaning for each of the one or more search terms included with each of the combinations based on a meaning of terms included with hierarchical taxonomy data, perform a search for search results based on the meaning associated with one of the one or more search terms of one of the combinations, and provide the search results.

According to still another aspect, a device may include means for receiving a search query that includes search terms, means for parsing the search query into combinations, where each of the combinations includes one or more of the search terms, means for selecting meanings for each of the one or more search terms included in each of the combinations based on a meaning of terms included with hierarchical taxonomy data, means for scoring each of the combinations based on the meanings associated with the one or more search terms, means for performing a search based on the meaning associated with one of the combinations to identify a search result, and means for providing the search result.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Figure 1:
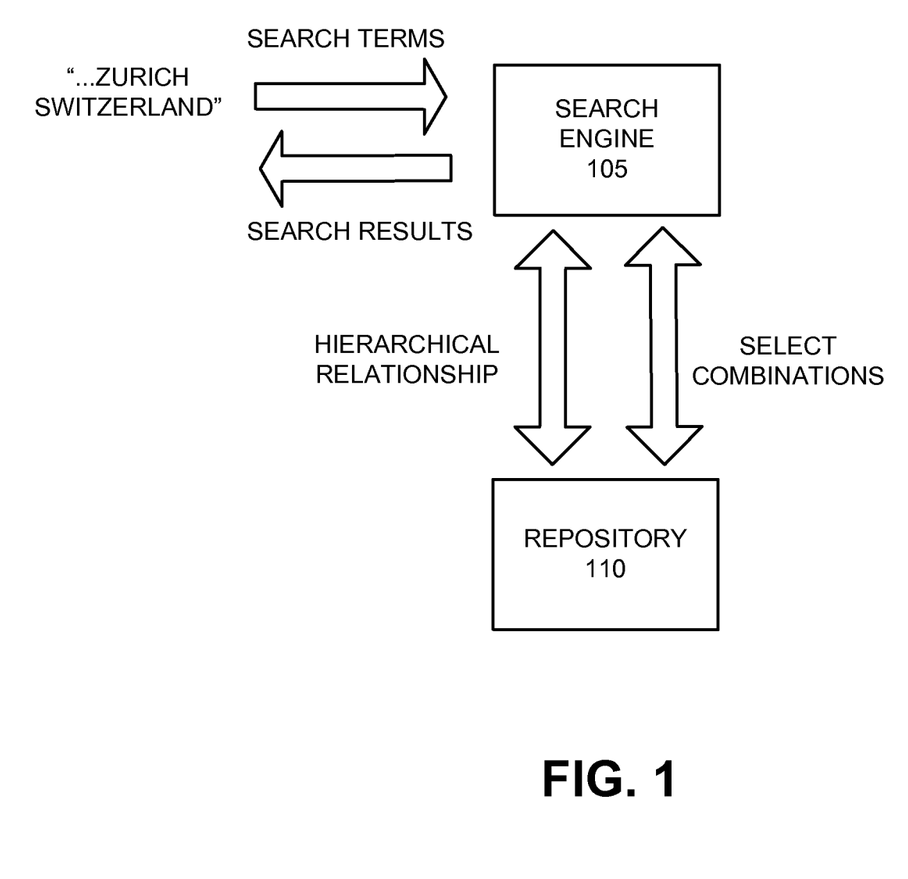
FIG. 1 is a diagram illustrating systems and methods for performing a search.

One approach for interpreting search terms of a search query may be based on a tendency of a user to enter terms, which have a hierarchical relationship, adjacent to each other. FIG. 1 is a diagram illustrating systems and methods for performing a search. For example, assume that a user enters a search query that contains a set of search terms, and instructs his browser to provide the search query to a search engine. The search query may be received by search engine 105. For example, assume that a portion of the search query includes the search terms "Zurich Switzerland." In this case, the search term "Zurich" is adjacent to the search term "Switzerland" within the search query. Additionally, there exists a hierarchical relationship between the search terms "Zurich" and "Switzerland." That is, "Zurich," a city, and "Switzerland," a country, have a hierarchical geographic relationship. It will be appreciated that although geographic search terms are representative of what may constitute a hierarchical relationship, hierarchical relationships exist in a broader spectrum of search terms. That is, search terms corresponding to objects, things, concepts, events, biological entities, plants, etc., may be entered as adjacent search terms that have a hierarchical relationship. In this regard, the phrase "hierarchical relationship," is intended to be broadly interpreted to include, for example, related instances of a category(s), a classification(s), etc., that have an order based on rank, class, grade, etc. For example, adjacent terms may have a parent-child relationship (e.g., class, sub-class, group-sub-group, genus-species, combination, sub-combination, etc.).

Search engine 105 may parse the search terms to form select, but not necessarily all, combinations of the search terms. A combination may include one or more search terms. A combination having more than one search term may include search terms that are adjacent to each other within the entered search query. For example, if a search query contains the search terms "oranges fruit Florida," search engine 105 would parse the search query into adjacent search terms "oranges fruit Florida," "oranges fruit," and "fruit Florida." However, search engine 105 would not parse the search query to form a combination containing the search terms "oranges" and "Florida," since "oranges" and "Florida" are not adjacent search terms. In this case, as previously mentioned, the search term "Zurich" is adjacent to the search term "Switzerland."

A combination may be interpreted based on a hierarchical scheme. For example, repository 110 may include hierarchical data. Search engine 105 may utilize the hierarchical data to interpret the adjacent search terms of a combination. For example, search engine 105 may compare the adjacent search terms to the hierarchical data. By way of example, the hierarchical data may include the terms "Zurich" and "Switzerland." Based on the comparison, search engine 105 may recognize that a hierarchical relationship (e.g., city, country) exists between the adjacent search terms "Zurich" and "Switzerland." Search engine 105 may interpret these adjacent search terms in correspondence to the hierarchical data.

Once the combinations of a search query are interpreted, search engine 105 may generate a relevance score for each interpretation. The relevance score may indicate a likelihood of matching a user's intended meaning of the search terms. For example, search engine 105 may utilize templates to score each interpretation. A template may include a pattern of hierarchical? terms that correspond to an order in which a user may formulate a search query. By way of example, a template related to a geographical taxonomy may correspond to the terms "city, state" or "state, country." In this example, search engine 105 may match a template "city, country" with the interpreted search terms "Zurich Switzerland." Search engine 105 may assign a score, that is associated with the matched template, to the interpretation of "Zurich Switzerland" as a "city, country" hierarchy.

Based on the relevance score of each interpretation, search engine 105 may search, for example, for Web pages that correspond to one or more of the scored interpretations. By way of example, search engine 105 may search Web pages that correspond to the interpreted meaning of "Zurich Switzerland" as having a city and country hierarchical relationship. The Web pages may be provided to, for example, a user and/or another search engine, as search results.

As a result of the foregoing, the search engine may provide more useful results because the search engine may interpret hierarchical meaning(s) associated with the search terms within the search query and search for results that correspond to the interpreted hierarchical meaning(s). Since the approach for interpreting search terms, scoring the search terms, conducting a search based on the meanings of the search terms, and providing search results have been broadly described, a more detailed description is provided below, as well as variations thereof.

Environment

Figure 2:
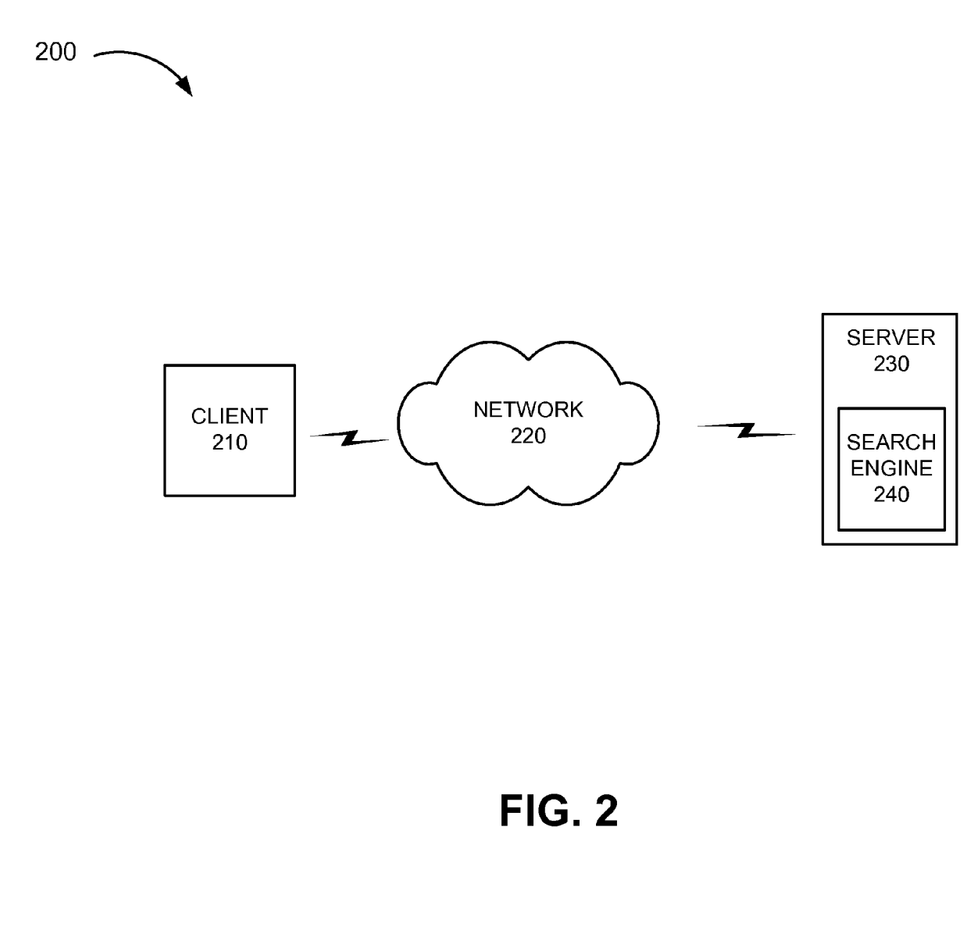
FIG. 2 is a diagram of a network in which systems and methods described herein may be implemented.

FIG. 2 is a diagram illustrating an environment in which systems and methods described herein may be implemented. As illustrated, environment 200 may include a client 210, a network 220, and a server 230. Server 230 may include a search engine 240. Client 210 and server 230 may connect to network 220 via wired and/or wireless connections.

Client 210 may be, for example, a computer, a mobile phone, a personal digital assistant (PDA), and/or another type of communication device. Additionally, or alternatively, client 210 may be a program, a process, a fiber, or a thread running on a communication device and/or an object executable by a communication device.

Network 220 may be a local area network (LAN), a wide area network (WAN), a telephone network, such as the Public Switched Telephone Network (PSTN), an intranet, the Internet, any other type of network, and/or a combination of networks.

Server 230 may be, for example, a device of a collection of devices. Additionally, or alternatively, server 230 may be software running on a device or a collection of devices. Search engine 240 may be, for example, software to search and/or retrieve information based on a search request. For example, search engine 240 may service search requests from client 210. Search engine 240 may be designed to return search results, such as Web pages, business listings, and/or maps based on the search request. In one implementation, the search results may be returned to client 210. Additionally, or alternatively, the search results may be returned to another search engine (not illustrated).

Although FIG. 2 illustrates an environment, in other implementations, the environment may include fewer, additional, or different devices. For example, one client 210 and one server 230 have been illustrated as connected to network 220 for simplicity. In practice, there may be more clients 210 and/or servers 230. Also, in some instances, client 210 may perform one or more functions of server 230 and/or server 230 may perform one or more functions of client 210. Additionally, or alternatively, server 230 may be implemented in a distributed manner. For example, server 230 may be a back-end component that operates in parallel with another server(s) and/or search engine(s).

Example Device

Figure 3:
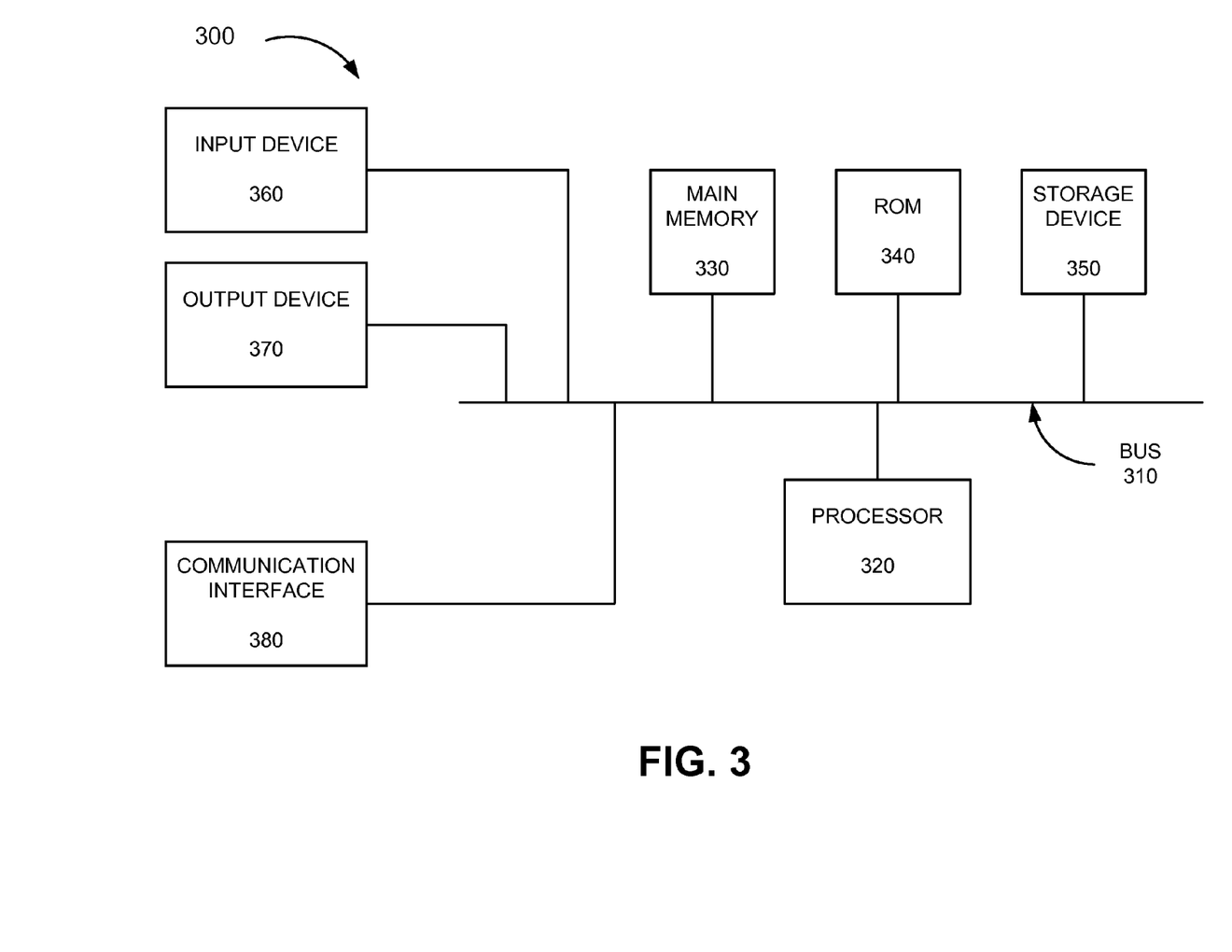
FIG. 3 is diagram of a device which may correspond to the client and/or the server depicted in FIG. 2.

FIG. 3 is a diagram of a device which may correspond to the client and/or the server depicted in FIG. 2. As illustrated, device 300 may include a bus 310, a processor 320, a main memory 330, a read only memory (ROM) 340, a storage device 350, an input device 360, an output device 370, and a communication interface 380.

Bus 310 may include a path that permits communication among the elements of device 300. Processor 320 may include a processor, microprocessor, or processing logic that may interpret and execute instructions. Main memory 330 may include a random access memory (RAM) or another type of dynamic storage device that may store information and/or instructions for execution by processor 320. ROM 340 may include a ROM device or another type of static storage device that may store static information and/or instructions for execution by processor 320. Storage device 350 may include a magnetic and/or an optical recording medium and its corresponding drive.

Input device 360 may include a mechanism that permits an operator to input information to the device, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the device to communicate with other devices and/or systems. For example, communication interface 380 may include a mechanism for communicating with another device or system via a network, such as network 220.

Device 300 may perform certain operations, as will be described in detail below, in response to processor 320 executing software instructions contained in a computer-readable medium, such as memory 330. A computer-readable medium may be defined as one or more devices capable of storing instructions and/or data. For example, a computer-readable medium may correspond to a memory (e.g., main memory 330), storage device 350, or another type of device (e.g., a digital versatile disk (DVD), a compact disk (CD), etc.). The computer-readable medium may be implemented in a distributed manner (e.g., between two or more device 300s). The software instructions may be read into memory 330 from storage device 350, or from another device via communication interface 380. The software instructions contained in memory 330 may cause processor 320 to perform processes that will be described later. Alternatively, hardwired circuitry may be used in place of or in combination with software instructions to implement processes as described herein. Thus, implementations as described herein are not limited to any specific combination of hardware circuitry and software.

Although FIG. 3 illustrates a device 300, in other implementations, device 300 may include additional, fewer, or different components. For example, device 300 may not include input device 360. Additionally, or alternatively, in other implementations, device 300 may include an arrangement of components that are different than that depicted in FIG. 3.

Search System

Figure 4:
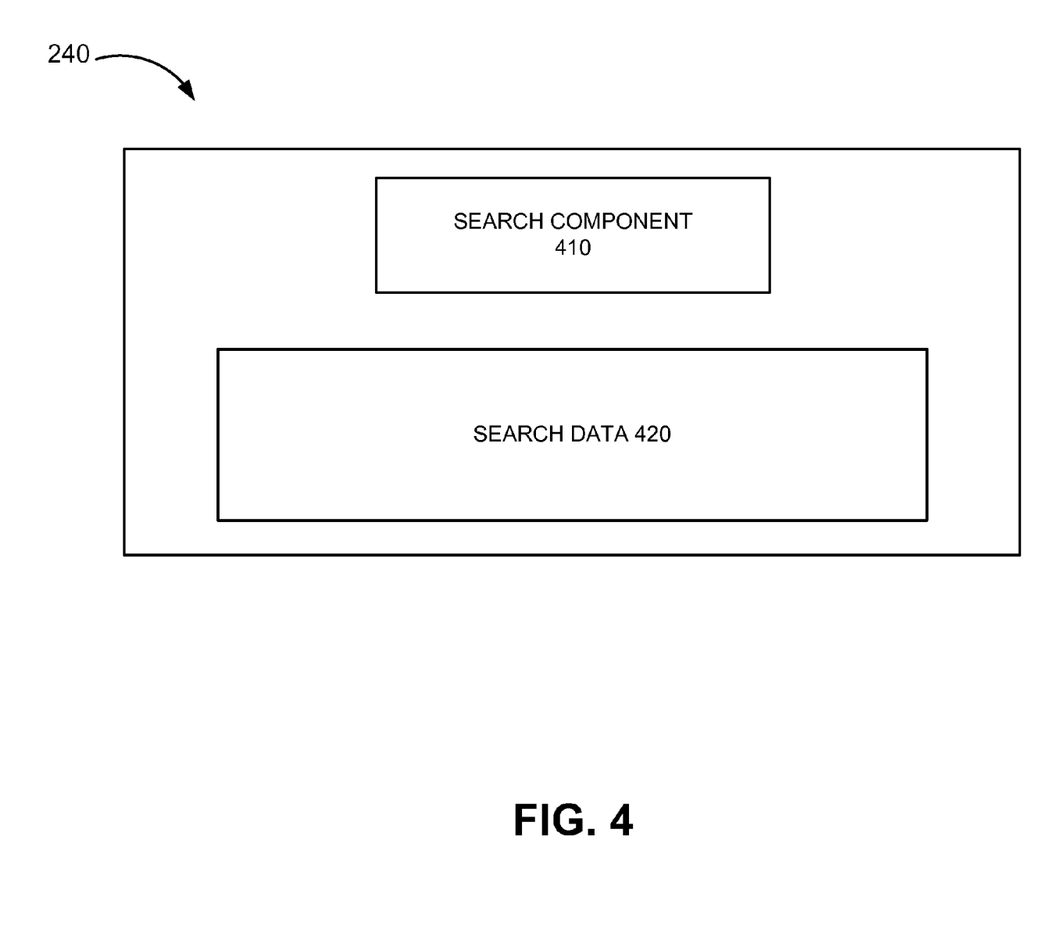
FIG. 4 is a diagram illustrating components of the search engine depicted in FIG. 2.

FIG. 4 is a diagram illustrating components of the search engine depicted in FIG. 2. The term "component," as used herein, is intended to be broadly interpreted to include hardware or a combination of hardware and software. Search engine 240 may include a search component 410 and search data 420.

Search component 410 may include one or more algorithms to perform various operations in accordance with the systems and methods described herein. For example, search component 410 may receive a search query, parse a search query, perform a search of search data 420 based on the search query, interpret the search query, score an interpretation(s) of the search query, and/or return a search result(s).

Search data 420 may include indexed data that may be utilized by search component 410 to interpret a search query. The indexed data may include data that is stored in an index by an indexer (not illustrated). For purposes of discussion, the indexed data will be described as relating to a geographical taxonomy. In this instance, the indexed data may be used for interpreting a search query as a reference to a place on Earth. It will be appreciated, however, that the indexed data may relate to other taxonomies (e.g., a business listing taxonomy, a biological taxonomy, etc.), instead of, or in addition to, a geographical taxonomy. In such instances, the indexed data may be used for interpreting a search query as a reference to a biological entity (e.g., an animal, a plant, etc.), interpreting a search query as a reference to a business (e.g., a name of a business), and/or in another manner according to the taxonomy implemented.

Search data 420 may also include data other than geographical data. For example, search data 420 may include an index of business listings, business information, Web pages, or other information (e.g., metadata) that may be associated with the geographical data. Search data 420 may include map data. The map data may be searchable by geographic location. In one implementation, the map data may include a graphical map, boundary information, and/or latitude and longitude coordinates. Search data 420 may also include user information. For example, user information may include the locale of a user from which the search query was sent.

Various data structures may be utilized in storing search data 420. A portion of the indexed data may be stored in a data structure suitable for hierarchical data. For example, in one implementation, a tree data structure may be used to store the geographical data (i.e., corresponding to the geographical taxonomy). In other implementations, a different type of data structure (e.g., a linked list, etc.) may be utilized to store the geographical data. Other types of data structures (e.g., a table, etc.) may store other portions of the indexed data.

Although FIG. 4 illustrates components of search engine 240, in other implementations, fewer, different, or additional components may be utilized. For example, search engine 240 may include a graphical user interface (GUI) to receive a search query and/or to present search results. Additionally, or alternatively, in other implementations, the arrangement of components may be different than the arrangement depicted in FIG. 4. Additionally, or alternatively, search component 410 and/or search data 420 may be implemented in a distributed manner (e.g., between multiple search engines, devices (e.g., servers), etc.).

Figure 5:
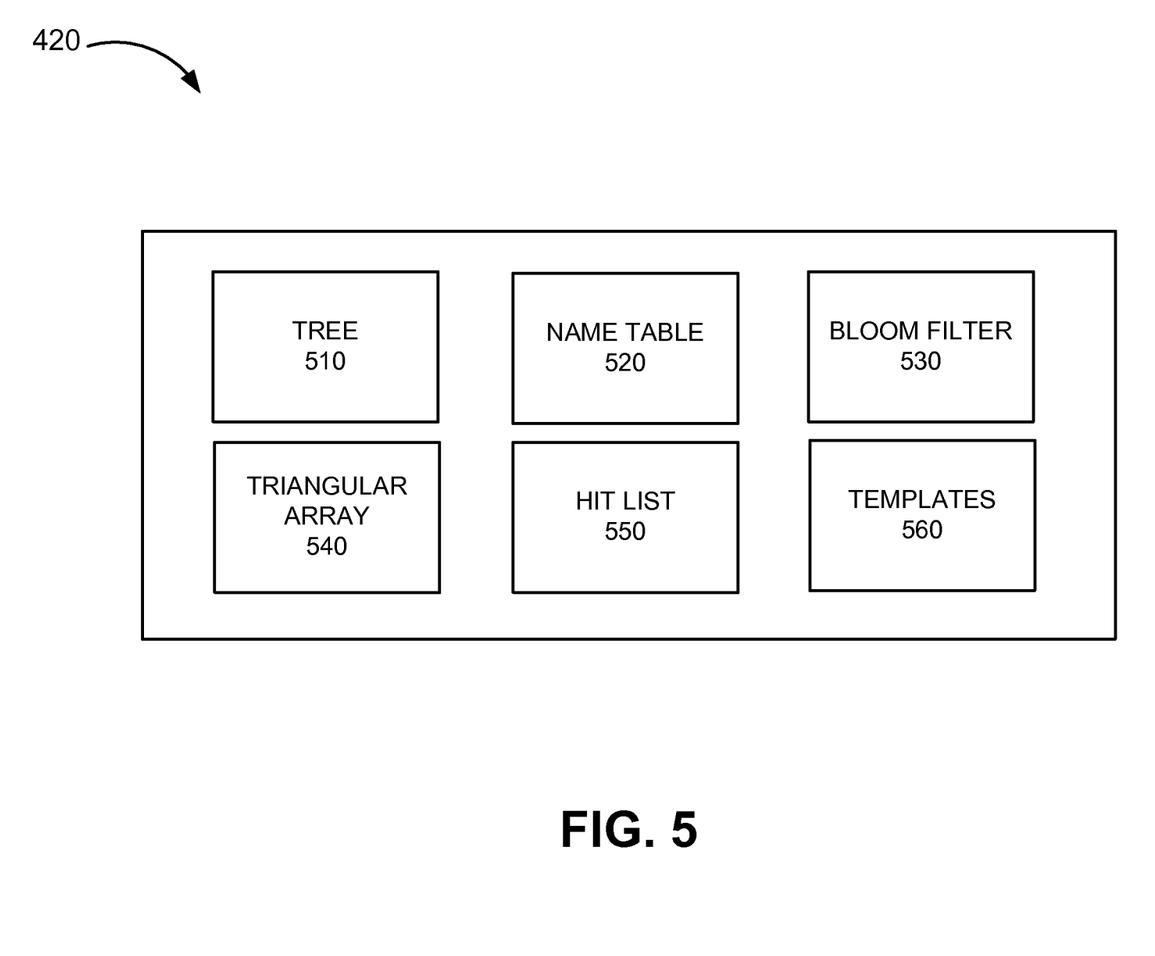
FIG. 5 is a diagram illustrating data that may be maintained by the search data depicted in FIG. 4.

FIG. 5 is a diagram illustrating data that may be maintained in search data 420 depicted in FIG. 4. As illustrated, search data 420 may include a tree 510, a name table 520, a bloom filter 530, a triangular array 540, a hit list 550, and templates 560. Each of these is a data structure that may be stored in a computer-readable medium.

Tree 510 may include indexed data (e.g., geographical data). Tree 510 may include a root node and parent/child nodes in correspondence to a hierarchical structure. The root of tree 510 may include, for example, the "Earth," and the remaining nodes may follow a hierarchical order, such as "continents," followed by "countries," "regions," "cities," "postal codes," and "points-of-interest." Depending on, for example, the location on Earth, a different hierarchical order of nodes may be utilized. For example, a portion of tree 510 that corresponds to the United States of America ("United States"), may include a hierarchical order of nodes, such as "country," "state," and "city." Additionally, or alternatively, tree 510 may include nodes, such as, for example, "street address," "global postal codes," and/or other nodes that correspond to an even more specific locale. For example, when search engine 240 may be utilized to perform a map search, tree 510 may include nodes having these more specific locales.

In addition to nodes corresponding to locations on Earth (i.e., geographical data), tree 510 may include nodes that do not include geographical data. For example, in some instances, a search term may include a name that corresponds to a place even though a user may not mean a place. For example, the search query may include the search terms "Orlando Bloom," a movie actor. Thus, while the search term "Orlando," may correspond to a city in Florida in the United States; the search terms "Orlando Bloom," may correspond to the movie actor. In this regard, search engine 240 may not interpret "Orlando" as a city since "Orlando" appears adjacent to "Bloom." Rather, search engine 240 may interpret "Orlando Bloom" as a person.

Tree 510 may also include attribute information. Attribute information may include, for example, the type of node, such as whether a node corresponds to a continent, country, city, or point of interest, a stand-alone value, a country stand-alone value, a relational value, map data, latitude and longitude information, boundary information, and/or other information (e.g., user location information).

The stand alone value may correspond to a value that represents an importance of a location in the context of the Earth. For example, the search terms "New York" may impart a significant degree of importance since "New York" may be considered well-known throughout the world. Thus, the stand-alone value for "New York" may be afforded a higher stand-alone value compared to another locale that may not be well-known throughout the world. The stand alone value may be based on, for example, the population of the location, well-known points of interest in the location, the size of the location, the number of searches relating to the location, the number of Web pages relating to the location, etc.

The country stand-alone value may correspond to a value that represents an importance of a location in the context of a country. For example, the search terms "Valencia, Canada" and "Valencia, Spain" may have different country stand-alone values since "Valencia" in Spain may be considered more important than "Valencia" in Canada. The country stand-alone value may be based on, for example, the population of the location, well-known points of interest in the location, the size of the location, the number of searches relating to the location, the number of Web pages relating to the location, etc.

The relational value may correspond to a value that represents an association between the search term and the name of the location. For example, the relational value may indicate whether the search term corresponds to a primary name, an official name, or a colloquial name. For example, a search term, such as "Massachusetts," may be considered a primary name. However, the search terms "The Commonwealth of Massachusetts" and/or the "State of Massachusetts" may be considered an official name. The search terms "Bay Area" may be considered a colloquial name for "San Francisco."

Map data may include a representation of an area. For example, as previously described, map data may include a graphical map. Latitude and longitude information may correspond to geographic coordinates. Boundary information may include map location information surrounding a center point relating to a locale.

Attribute information may be used by search engine 240 for, among other things, interpreting the search terms, scoring, and/or presenting information with the search results.

Name table 520 may include indexed data. For example, a name may correspond to a place, such as "Paris." Each name in name table 520 may include one or more pointers that point to all the items that it corresponds to in tree 510. So, for example, the name "Paris," may have associated with it, a corresponding pointer that points to a city in France, a town in Texas, and a street in San Francisco in tree 510. Thus, a name in name table 520 may have associated with it a pointer that points to multiple nodes in tree 510. Conversely, a node of tree 510 may be pointed to by multiple pointers associated with multiple names of name table 520. For example, name table 520 may include names, such as "New York," "New York City," and "Big Apple." In this instance, the pointers associated with these names may point to the same node in tree 510. Name table 520 may include names that may not be places. For example, as previously described above, name table 520 may include the name "Orlando Bloom."

Bloom filter 530 may include, for example, prefixes to a longer name. For example, bloom filter 530 may include prefixes that may be an article, such as "the," or prefixes, such as "new," as in "New York." Thus, for example, these prefixes may not correspond to a place when considered in isolation; however, these prefixes may have a nexus to an adjacent search term, which, when taken together, may or may not correspond to a place.

Triangular array 540 may include select combinations of the search terms of a search query. The combinations of search terms may be thought of as a triangular array. In such an instance, each field of triangular array 540 may include a combination of the search terms. The number of combinations (i.e., fields of triangular array 540) may be calculated by the formula $(N*(N+1))/2$, where N corresponds to the number of search terms in the search query. So, for example, a search query containing four search terms may yield, when parsed, ten different combinations of the search query. As an example, assume that search query contains three search terms, "Pizza Zurich Switzerland." Triangular array 540 may include the following combinations: "Pizza Zurich Switzerland," "Zurich Switzerland," "Switzerland," "Pizza Zurich," "Zurich," and "Pizza." That is, triangular array 540 may include each combination of adjacent search terms (e.g., "Pizza Zurich Switzerland," "Zurich Switzerland," and "Pizza Zurich"), as well as individual search terms ("Pizza," "Zurich," and "Switzerland").

Hit List 550 may include a list of interpretations relating to the search terms of the search query that match name table 520 and/or tree 510. These interpretations of hit list 550 may be scored based on a ranking algorithm included in search component 410, as will be described below.

Templates 560 may include elements that provide a reference to score interpretations contained in hit list 550. For example, templates 560 related to a geographical taxonomy may include elements corresponding to "city, state," "city, state, country," etc. In other words, the elements of a template 560 may include a pattern of terms that correspond to an order in which a user may formulate a search query.

Although FIG. 5 illustrates data, in other implementations, fewer, different, or additional data may be utilized. Additionally, or alternatively, and in other implementations, different data structures may be utilized. Further, search data 420 may include additional information not specifically described herein, such as location of the user, which may be used by search engine 240 for interpreting, scoring, and/or providing search results. Additionally, or alternatively, although attribute information has been described in relation to tree 510, attribute information may be contained in other data structures, in combination among data structures in search data 420, and/or elsewhere on server 230.

Figure 6:
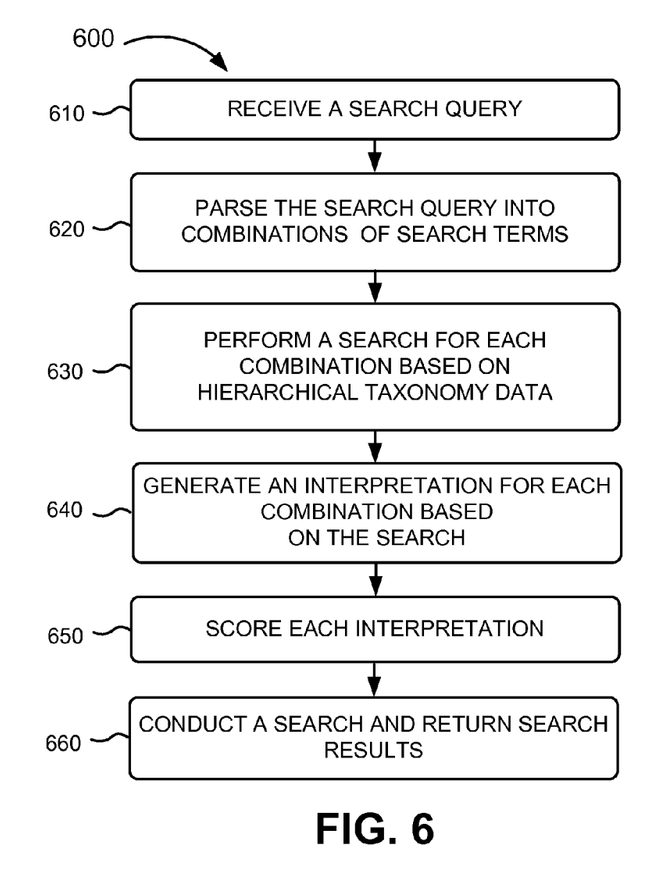
FIG. 6 is a flow chart illustrating a process for generating search results.

FIG. 6 is a flow chart illustrating a process for generating search results. In one implementation, the blocks of FIG. 6 may be performed by server 230. In another implementation, one or more blocks may be performed by a device other than server 230 or in combination with server 230.

As illustrated, process 600 may begin with a search query being received from a user (Block 610). For example, server 230 may receive a search query from client 210 via network 220. For example, a user of client 210 may provide a search query via a Web browser. In one implementation, search engine 240 may provide a graphical user interface (GUI) for a user to enter search terms. For example, the GUI may include one or more search boxes for entering a search query, and a search button to initiate the search. In one implementation, the search box may be a single text box in which the user may not be able to characterize the search terms (e.g., which part of the search query corresponds to, for example, a "where" part, a "who" part, a "what" part, etc.). Nevertheless, search engine 240 may interpret the search query in accordance with a hierarchical taxonomy based on the operations described herein. In other implementations, search engine 240 may not provide a GUI. For example, search engine 240 may be a backend component that receives a search query from another search engine.

For purposes of discussion, assume that a user would like to find restaurants. In this example, the user may enter a search query, such as "Restaurants Amsterdam the Netherlands" in the search box. The user may initiate the search by pressing the search button.

The search query may be parsed into combinations of search terms (Block 620). For example, search component 410 may parse the search query into a combination(s) of search term(s) in the order in which the search term(s) were entered by the user. The combination may include one or more search terms. A combination having more than one search term may include search terms that are adjacent (e.g., search terms that appear next to each other in the order entered by the user). For example, search component 410 may select which search terms are adjacent based on the order of the search terms in the search query. In one implementation, the combinations may include each combination of adjacent search terms. In another implementation, adjacent search terms may include search terms that are not actually adjacent within the search query (e.g., search terms that are separated by stop-words). For example, a search query may include stop-words, such as "a" or "and," that may be discarded and/or ignored. In such instances, search terms may be considered adjacent by virtue of discarding or ignoring a stop-word.

As an example of parsing a search query, the search query "Restaurants Amsterdam the Netherlands" may be parsed into the following combinations: "Restaurants Amsterdam the Netherlands," "Amsterdam the Netherlands," "the Netherlands," "Netherlands," "Restaurants Amsterdam the," "Amsterdam the," "the," "Restaurants Amsterdam," "Amsterdam," and "Restaurants." That is, search component 410 may parse the search query "Restaurants Amsterdam the Netherlands" into every combination of adjacent search terms, as well as individual search terms.

In one implementation, search engine 240 may store the combinations in triangular array 540. Additionally, or alternatively, search engine 240 may hash each search term to a size that minimizes collisions when searching and/or matching, for example, search terms with the information contained in name table 520 and/or tree 510, as described below.

A search may be performed for each combination based on hierarchical taxonomy data to generate an interpretation (Block 630). Search component 410 may conduct a search for each combination utilizing search data 420. In one implementation, search data 420 may include data, such as name table 520, which may provide an index to hierarchical taxonomy data, such as tree 510. The hierarchical taxonomy data may include any hierarchical data, such as geographical, biological (e.g., plants or animals), business, objects, people (e.g., by profession), etc.

In one implementation, search component 410 may compare each combination of triangular array 540 to information in name table 520. This process may be performed serially or in parallel. In such an instance, each search term of a combination may be matched with information in name table 520. When a match between a search term of triangular array 540 and a name of name table 520 occurs, search component 410 may reference tree 510 based on the one or more pointers associated with the name of name table 520 that point to one or more nodes of tree 510. A match between one or more search terms of a combination and a name contained in name table 520 may constitute a hit. For example, referring back to the search query "Restaurants Amsterdam the Netherlands," search component 410 may consider the combination "Restaurants Amsterdam." Limiting our discussion to geographical data, search component 410 may find a match between the search term "Amsterdam" and a name "Amsterdam" in name table 520. Search component 410 may refer to tree 510 based on one or more pointers associated with the name "Amsterdam" in name table 520.

In some instances, more than one search term of a combination may match one or more names in name table 520. In these instances, search component 410 may determine whether the adjacent search terms of a combination have a hierarchical relationship by performing walk-ups in tree 510.

Figure 7:
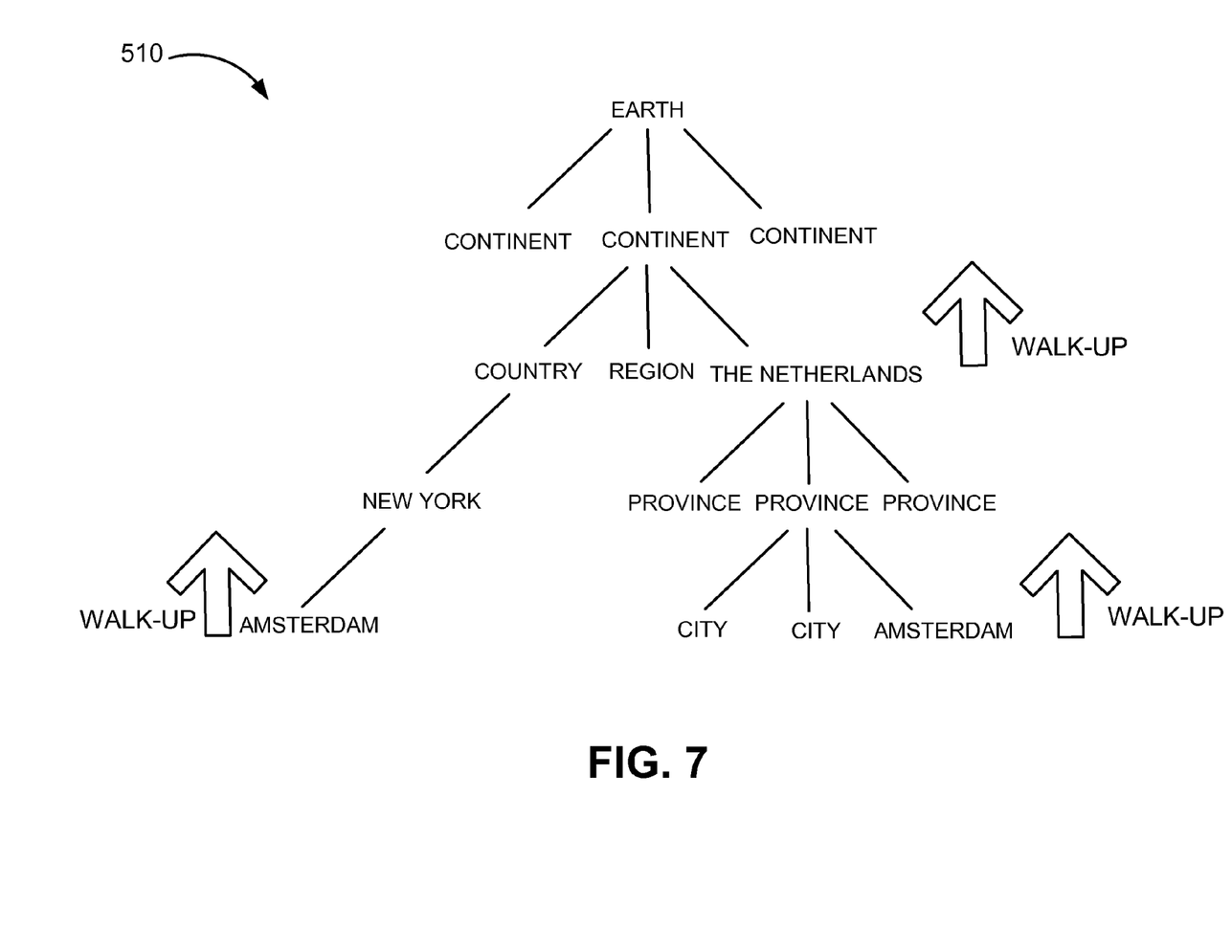
FIG. 7 is a diagram illustrating an operation for determining whether a hierarchical relationship exists.

FIG. 7 is a diagram illustrating an operation for determining whether a hierarchical relationship exists. For example, search component 410 may consider the combination "Amsterdam the Netherlands." Search component 410 may find a match between the search term "the Netherlands" and a name "the Netherlands" in name table 520. Search component 410 may also find a match between the search term "Amsterdam" and a name "Amsterdam" in name table 520. Search component 410 may refer to tree 510 based on one or more pointers associated with each name in name table 520. In this instance, search component 410 may perform a walk-up from the node "Amsterdam" and a walk-up from the node "the Netherlands," as illustrated in FIG. 7. As a result, search component 410 may determine that a hierarchical geographic relationship exists between the search term "Amsterdam" and the search term "the Netherlands." Additionally, if a pointer in name table 520 should point to other nodes in tree 510 called "Amsterdam," this hit, in one implementation, may be eliminated since adjacent search terms "Amsterdam" and "the Netherlands" have been joined. For example, as illustrated in FIG. 7, a node "Amsterdam" in tree 510 may relate to a city in New York. Accordingly, a walk-up from this node will not intersect with the node "the Netherlands."

When conducting the search, search component 410 may also perform one or more other operations depending on the combination. For example, in one instance, search component 410 may consider the combination "Amsterdam the." While the search term "the" may not result in a hit, search component 410 may reference bloom filter 530. Search component 410 may recognize the search term "the" as a preposition and/or as a connector, which may trigger search component 410 to consider the search term adjacent to the search term "the." Another example of such an instance relates to the search terms "New York." That is, search component 410 may recognize the search term "New" as a preposition and/or as a connector, based on bloom filter 430, which may trigger search component 410 to consider the search term adjacent to the search term "New."

Given the multitude of possible search queries, variations to the above example may exist. For example, in some instances, the search query may contain a repetition of identical search terms, such as "Zurich, Zurich, Zurich." However, since a pointer in name table 520 may point to any node of tree 510 with the name "Zurich," search component 410 may determine a multitude of hierarchical relationships associated with these adjacent terms ranging from, for example, three separate and distinct search terms having no hierarchical relationship to three search terms having a hierarchical relationship.

Referring back to FIG. 6, an interpretation may be generated for each combination based on the search (Block 640). For example, search component 410 may generate an interpretation for each combination based on search data 420, such as attribute information, name table 520, bloom filter 530, and/or tree 510. For example, search component 410 may associate a meaning to the one or more search terms within each combination in correspondence to matches to search data 420. In one implementation, the interpretations may be assembled in, for example, hit list 550.

Each interpretation may be scored (Block 650). As previously described, search component 410 may include a ranking algorithm to score each interpretation. Search component 410 may utilize templates 560 to score each interpretation. Additionally, search component 410 may assign a score to each interpretation based on one or more rules or heuristics. For example, the rules or heuristics may include considerations, such as, an order of the meaning of the search terms within a combination, the number of matched search terms within a combination, attribute information, etc.

For example, search engine 240 may compare various templates 560 to an interpretation. For example, a template 560, such as a geo-template "city, country," may be compared to an interpretation associated with the search terms "Amsterdam the Netherlands." When an interpretation corresponds to template 560, as in this example, the interpretation may be assigned a score associated with template 560. In some cases, an interpretation may correspond to more than one template 560; however, the scores may be different. For example, when a user resides in the United States, and an interpretation corresponding to template 560 (e.g., "city, state") and an interpretation corresponding to template 560 (e.g., "street, country") exist (i.e., both templates match the search terms), search component 410 may assign a higher score to the interpretation corresponding to template 560 (e.g., "city, state") than the interpretation corresponding to template 560 (e.g., "street, country"). In other words, template 560 corresponding to "city, state" may provide a higher score than another template 560 corresponding to "street, country" because the user in the United States is more likely (e.g., based on generalized user tendencies, rules, heuristics, etc.) to intend this order of meaning to these search terms.

Templates 560 may also be tailored to the user's location. For example, a user in the country of Thailand may describe a location in a search query in a different search term order and/or according to a different geographic hierarchy compared to a user in the country of the United States. Accordingly, search component 410 may apply templates 560 that correspond to the user's location. In one implementation, a user's geographic location information may be obtained from the user's network address (e.g., an IP address) and/or the domain from which the user may have accessed server 230. Additionally, or alternatively, other information, such as attribute information may interrelate to the location of the user and impact the scoring of the interpretation.

Additionally, or alternatively, search component 410 may score an interpretation based on attribute information. For example, attribute information may be considered, such as whether a node of tree 510 corresponds to a continent, country, city, or point of interest, as well as a stand alone value, a country stand-alone value, and/or a relational value associated with the node.

Search component 410 may keep or discard an interpretation based on whether the score associated with an interpretation exceeds a threshold value. Additionally, or alternatively, search component 410 may select a certain number of interpretations based on a preset value.

A search may be conducted and search results may be returned (Block 660). For example, search engine 240 may conduct a search based on one or more scored interpretations. That is, search engine 240 may conduct a search having knowledge of the hierarchical meaning of the search terms associated with the one or more interpretations to identify search results that are relevant to the meaning of the search terms. Search engine 240 may search the World Wide Web (WWW) and/or some other repository of information. Search engine 240 may transmit a Web page to the user that includes links to relevant search results. In other implementations, for example, search engine 240 may transmit the scored interpretations and/or the search results to another search engine for further processing. That is, for example, server 230 and search engine 240 may be a backend component that works in parallel with other servers and/or search engines (not illustrated in FIG. 2) to interpret search queries.

In one implementation, descriptive information associated with the search result may also be provided. For example, when search engine 240 utilizes geo-coding to interpret a search query (i.e., to interpret the search query as a place or a geographical location), additional information, such as graphical map information may be provided. Additionally, or alternatively, a telephone number, address information, traffic information, weather, events occurring in a particular area, and/or driving directions, may be included with the search results.

Although FIG. 6 illustrates operations, in other implementations, fewer, additional, or different operations may be performed. For example, when a search query includes only one search term, block 620 may be omitted. Additionally, or alternatively, search engine 240 may perform walk-downs in tree 510 instead of walk-ups.

As described herein, search engine 240 may provide multiple interpretations of adjacent terms that may have a hierarchical relationship. Further, search engine 240 may provide for an expansive platform to interpret a search query based on any type of hierarchical taxonomy.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the teachings. The search engine, as described herein, may utilize various taxonomies having a hierarchical schema, such as geographical taxonomies, business listing taxonomies, biological taxonomies, etc., as described above. Additionally, it will be appreciated that the search engine may be applicable to environments other than the Web or the Internet. That is, the search engine, described herein, may be utilized to search any type of repository of data.

In addition, while a series of blocks has been described with regard to the process illustrated in FIG. 6, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, a search query that includes a plurality of search terms;
   parsing, by the device, the search query to define one or more combinations of the plurality of search terms,
      each combination, of the one or more combinations of the plurality of search terms, including a subset of the plurality of search terms;
   determining, by the device, that at least one combination of the one or more combinations of the plurality of search terms exists in a hierarchical relationship by matching the subset of the plurality of search terms, in the at least one combination, to a pattern of terms at different hierarchical levels in a hierarchical taxonomy,
      matching the subset of the plurality of search terms, in the at least one combination, to the pattern of terms at the different hierarchical levels in the hierarchical taxonomy including:
         matching a first search term, of the subset of the plurality of search terms in the at least one combination, to a first term of the pattern of terms at the different hierarchical levels,
            the first term being at a first hierarchical level of the different hierarchical levels, and
         matching a second search term, of the subset of the plurality of search terms in the at least one combination, to a second term of the pattern of terms at the different hierarchical levels,
            the second term being at a second hierarchical level of the different hierarchical levels,
               the second hierarchical level being different from the first hierarchical level,
            the first search term, of the subset of the plurality of search terms in the at least one combination, and the second search term, of the subset of the plurality of search terms in the at least one combination, being adjacent search terms;
   generating, by the device, a score for the at least one combination based on matching the subset of the plurality of search terms, in the at least one combination, to the pattern of terms at the different hierarchical levels in the hierarchical taxonomy;
   interpreting, by the device, the at least one combination based on matching the subset of the plurality of search terms, in the at least one combination, to the pattern of terms at the different hierarchical levels in the hierarchical taxonomy when the score is greater than a threshold; and
   searching, by the device, for documents responsive to the search query based on interpreting the at least one combination.

2. The method of claim 1, where each combination, of the one or more combinations of the plurality of search terms, comprises a plurality of adjacent search terms in the search query.

3. The method of claim 1, where the hierarchical taxonomy is selected from the group consisting of geographical data, business listing data, and biological data.

4. The method of claim 1, where the hierarchical taxonomy is stored as a tree data structure, a linked list, or a table.

5. The method of claim 1, where generating the score for the at least one combination comprises scoring the at least one combination based on an attribute associated with at least one term in the pattern of terms.

6. The method of claim 5, where the attribute represents at least one of an importance of the at least one term or a hierarchical level of the at least one term in the hierarchical taxonomy.

7. The method of claim 1, where generating the score for the at least one combination comprises:
   scoring the at least one combination based on a score associated with a template that matches the pattern of terms.

8. A system, comprising:
   one or more memories storing instructions; and
   one or more processors to execute the instructions to:
      receive a search query that includes search terms;
      parse the search query to define one or more combinations of the search terms,
         each combination, of the one or more combinations of the search terms, including a subset of the search terms;
      match the subset of the search terms, in at least one combination, to a pattern of terms at different hierarchical levels in a hierarchical taxonomy,
         when matching the subset of the search terms, in the at least one combination, to the pattern of terms at the different hierarchical levels in the hierarchical taxonomy, the one or more processors are to:
            match a first search term, of the subset of the search terms in the at least one combination, to a first term of the pattern of terms at the different hierarchical levels,
               the first term being at a first hierarchical level of the different hierarchical levels, and
            match a second search term, of the subset of the search terms in the at least one combination, to a second term of the pattern of terms at the different hierarchical levels,
               the second term being at a second hierarchical level of the different hierarchical levels,
                  the second hierarchical level being different from the first hierarchical level,
               the first search term, of the subset of the search terms in the at least one combination, and the second search term, of the subset of the search terms in the at least one combination, being adjacent search terms;
      determine that the at least one combination exists in a hierarchical relationship based on matching the subset of the search terms, in the at least one combination, to the pattern of terms at the different hierarchical levels in the hierarchical taxonomy;
      score the at least one combination based on matching the subset of the search terms, in the at least one combination, to the pattern of terms at the different hierarchical levels in the hierarchical taxonomy;

interpret the at least one combination based on matching the subset of the search terms, in the at least one combination, to the pattern of terms at the different hierarchical levels in the hierarchical taxonomy when the score is greater than a threshold; and conduct a search, based on interpreting the at least one combination, to obtain search results responsive to the search query.

9. The system of claim 8, where each combination, of the one or more combinations of the plurality of search terms, comprises a plurality of adjacent search terms in the search query.

10. The system of claim 8, where the hierarchical taxonomy is selected from the group consisting of geographical data, business listing data, and biological data.

11. The system of claim 8, where the hierarchical taxonomy is stored as a tree data structure, a linked list, or a table.

12. The system of claim 8, where, when scoring the at least one combination, the one or more processors are to score the at least one combination based on an attribute associated with at least one term in the pattern of terms.

13. The system of claim 12, where the attribute represents at least one of an importance of the at least one term or a hierarchical level of the at least one term in the hierarchical taxonomy.

14. The system of claim 8, where, when scoring the at least one combination, the one or more processors are to score the at least one combination based on a score associated with a template that matches the pattern of terms.

15. A non-transitory computer-readable medium storing instructions, the instructions comprising:

a plurality of instructions which, when executed by one or more processors, cause the one or more processors to:

receive a search query that includes search terms;

parse the search query to define one or more combinations of the search terms, each combination, of the one or more combinations of the search terms, including a subset of the search terms;

match the subset of the search terms, in at least one combination, to a pattern of terms at different hierarchical levels in a hierarchical taxonomy, one or more instructions, of the plurality of instructions, to match the subset of the search terms, in the at least one combination, to the pattern of terms at the different hierarchical levels in the hierarchical taxonomy including:

one or more instructions to match a first search term, of the subset of the search terms in the at least one combination, to a first term of the pattern of terms at the different hierarchical levels, the first term being at a first hierarchical level of the different hierarchical levels, and one or more instructions to match a second search term, of the subset of the search terms in the at least one combination, to a second term of the pattern of terms at the different hierarchical levels, the second term being at a second hierarchical level of the different hierarchical levels, the second hierarchical level being different from the first hierarchical level, the first search term, of the subset of the search terms in the at least one combination, and the second search term, of the subset of the search terms in the at least one combination, being adjacent search terms;

determine that the at least one combination exists in a hierarchical relationship based on matching the subset of the search terms, in the at least one combination, to the pattern of terms at the different hierarchical levels in the hierarchical taxonomy;

score the at least one combination based on matching the subset of the search terms, in the at least one combination, to the pattern of terms at the different hierarchical levels in the hierarchical taxonomy;

interpret the at least one combination based on matching the subset of the search terms, in the at least one combination, to the pattern of terms at the different hierarchical levels in the hierarchical taxonomy when the score is greater than a threshold; and conduct a search, based on interpreting the at least one combination, to obtain search results responsive to the search query.

16. The non-transitory computer-readable medium of claim 15, where one or more instructions, of the plurality of instructions, to score for the at least one combination include:

one or more instructions to score the at least one combination based on an attribute associated with at least one term in the pattern of terms, where the attribute represents at least one of an importance of the at least one term or a hierarchical level of the at least one term in the hierarchical taxonomy.

17. The non-transitory computer-readable medium of claim 15, where one or more instructions, of the plurality of instructions, to score for the at least one combination include:

one or more instructions to score the at least one combination based on a score associated with a template that matches the pattern of terms.

18. A device comprising:

one or more memories to store instructions; and one or more processors to execute the instructions to:

receive a search query that includes search terms;

parse the search query to define one or more combinations of the search terms, each combination, of the one or more combinations of the search terms, including a subset of the search terms;

match the subset of the search terms, in at least one combination, to a pattern of terms at different hierarchical levels in a hierarchical taxonomy, when matching the subset of the search terms, in the at least one combination, to the pattern of terms at the different hierarchical levels in the hierarchical taxonomy, the one or more processors are to:

match a first search term, of the subset of the search terms in the at least one combination, to a first term of the pattern of terms at the different hierarchical levels, the first term being at a first hierarchical level of the different hierarchical levels, and match a second search term, of the subset of the search terms in the at least one combination, to a second term of the pattern of terms at the different hierarchical levels, the second term being at a second hierarchical level of the different hierarchical levels, the second hierarchical level being different from the first hierarchical level, the first search term, of the subset of the search terms in the at least one combination, and the second search term, of the subset of the search terms in the at least one combination, being adjacent search terms;

determine that the at least one combination exists in a hierarchical relationship based on matching the subset of the search terms, in the at least one combination, to the pattern of terms at the different hierarchical levels in the hierarchical taxonomy;

generate a score for the at least one combination based on matching the subset of the plurality of search terms, in the at least one combination, to the pattern of terms at the different hierarchical levels in the hierarchical taxonomy;

interpret the at least one combination based on matching the subset of the plurality of search terms, in the at least one combination, to the pattern of terms at the different hierarchical levels in the hierarchical taxonomy when the score is greater than a threshold; and search for documents responsive to the search query based on interpreting the at least one combination.

19. The device of claim 18, where the hierarchical taxonomy is selected from geographical data, business listing data, or biological data.

20. The device of claim 18, where, when generating the score, the one or more processors are to:

score the at least one combination based on a score associated with a template that matches the pattern of terms, or score the at least one combination based on an attribute associated with at least one term in the pattern of terms, where the attribute represents at least one of an importance of the at least one term or a hierarchical level of the at least one term in the hierarchical taxonomy.

* * * * *